(12) United States Patent
Baker et al.

(10) Patent No.: US 6,220,234 B1
(45) Date of Patent: Apr. 24, 2001

(54) COATED COMPRESSOR DIFFUSER

(75) Inventors: Glenn L. Baker; Paul D. Free, both of Columbus, IN (US)

(73) Assignee: Cummins Engine Company, Columbus, IN (US)

( * ) Notice: Subject to any disclaimer, the term of this patent is extended or adjusted under 35 U.S.C. 154(b) by 0 days.

(21) Appl. No.: 09/357,090

(22) Filed: Jul. 19, 1999

Related U.S. Application Data
(60) Provisional application No. 60/122,829, filed on Mar. 4, 1999.

(51) Int. Cl.$^7$ .............................. F02B 33/44; F02C 7/00; F04D 29/44
(52) U.S. Cl. ...................... 123/605.1; 60/751; 417/407; 415/200; 415/915; 29/888.02; 29/888.021; 29/889.2
(58) Field of Search ................................. 415/200, 173.1, 415/173.4, 177, 178, 915, 208.2, 208.3, 211.1, 211.2; 60/605.1, 751; 417/373, 407; 29/889.1, 889.2, 888.02, 888.021; 427/422, 447; 428/41.8, 421, 422, 450, 457–461

(56) References Cited

U.S. PATENT DOCUMENTS

| | | |
|---|---|---|
| 1,504,736 | 8/1924 | Brown . |
| 3,346,175 | 10/1967 | Wiles . |
| 3,764,373 | 10/1973 | Speirs et al. . |
| 3,998,716 | 12/1976 | Masar et al. . |
| 4,066,806 | 1/1978 | Speirs et al. . |
| 4,190,686 | 2/1980 | Muis . |
| 4,826,401 | 5/1989 | Clark et al. . |
| 4,988,266 | 1/1991 | Nakamura et al. . |
| 5,064,315 | 11/1991 | Samejima et al. . |
| 5,281,484 | 1/1994 | Tank et al. . |
| 5,441,763 | 8/1995 | Kuo . |
| 5,472,315 | 12/1995 | Alexander et al. . |
| 5,708,039 | 1/1998 | Daly et al. . |

FOREIGN PATENT DOCUMENTS

| | | |
|---|---|---|
| 1098876 | 1/1968 | (GB) . |
| 2195920 | 4/1988 | (GB) . |

OTHER PUBLICATIONS

Permalux Powder Coating—General Technical Data Sheet: printed from Permalux web site: http://www.permalux.com/en/ABC.htm Jan. 12, 1999, 3 pages.

Permalux Powder Coating—ABC About Powder Coating: printed from Permalux web site: http://www.permalux.com/en/tech.htm Jan. 12, 1999, 2 pages.

"Belzona Superglide" Technical Leaflet, 2 pages (no date).

*Primary Examiner*—Christopher Verdier
(74) *Attorney, Agent, or Firm*—Woodard, Emhardt, Naughton, Moriarty & McNett

(57) ABSTRACT

A coating for a portion of the flowpath of a diffuser of a centrifugal compressor. The coating covers a portion of the diffuser against which flows high velocity air from the compressor blades. The coating is a smooth, tenacious, heat-resistant powder paint that reduces the aerodynamic drag of the diffuser walls on the high velocity air thus increasing the efficiency of the compressor.

24 Claims, 4 Drawing Sheets

COATED COMPRESSOR DIFFUSER

This application claims priority to U.S. Provisional Patent Application Serial No. 60/122,829, filed Mar. 4, 1999, which is incorporated herein by reference.

BACKGROUND OF THE INVENTION

This invention relates to an internal coating for increasing the efficiency of a centrifugal compressor. More specifically, the invention relates to a powder paint coating within the volute of a turbocharger.

There is a continuing interest and importance to improving the thermal efficiency of the internal combustion engine. One of the most efficient forms of internal combustion engines is a diesel engine with a turbocharger. It is well known that the turbocharger utilizes waste heat of the exhaust gas to drive a compressor for compressing the intake air accepted by the diesel engine.

The role of the turbocharger in improving the brake specific fuel consumption (BSFC) of a diesel engine includes not just efficiently extracting power from the exhaust gas, but also using that power to efficiently compress the intake air. One general rule of thumb is that each one percent improvement in the efficiency of the turbocharger compressor relates to a one-third percent improvement in the BSFC of the engine.

One of the problems with centrifugal compressors of turbochargers is that the centrifuging action of the compressor provides air at high velocities into a diffuser. Although the diffuser, which is also called a volute on a turbocharger, slows the air exiting from the blades of the compressor, there is still a portion of the flowpath of the diffuser in which the high velocity air scrubs over the walls of the flowpath. This scrubbing action is aerodynamic drag of the air flowing over the wall. This drag reduces the total pressure of the air and increases the total temperature of the air, and thereby reduces the efficiency of the compressor.

There are techniques for smoothing the walls of the diffuser and thereby increasing the efficiency of the compressor. One such technique is to fabricate the volute from smooth, wrought materials, but this greatly increases the cost of the diffuser. It is more common to cast the diffuser so as to make it affordable. In some applications, sand casting is a preferred technique. However, even with selection of fine grain sand, the as-cast surfaces often have a surface roughness in excess of 250 microinches. This as-cast surface can be further machined as to improve its smoothness, although this additional machining operation necessarily increases the cost of the diffuser. One such technique is extrude honing.

What is needed is a technique for increasing the efficiency of centrifugal compressors in a cost-effective manner. The present invention does this in a novel and unobvious way.

SUMMARY OF THE INVENTION

Briefly describing one aspect of the present invention there is provided an apparatus comprising an internal combustion engine, a turbocharger, and a coating. The internal combustion engine produces exhaust gas. The turbocharger includes a turbine and a compressor. The turbine is powered by the exhaust gas, and the turbine powers the centrifugal compressor. The turbocharger defines a flowpath for slowing the air exiting from the compressor. There is a coating of heat-resistant powder paint along a portion of the flowpath. The coating provides a smooth surface to reduce the aerodynamic drag of the air flowing within the turbocharger.

Briefly describing another aspect of the present invention there is provided an apparatus comprising a centrifugal compressor, a cast diffuser, and a coating. The centrifugal compressor compresses gas. The cast diffuser defines an internal flowpath receiving compressed gas from the centrifugal compressor. There is a coating of heat-resistant paint on the cast diffuser along the portion of the internal flowpath.

Briefly describing another aspect of the present invention there is provided a method for improving the efficiency of a compressor. The method includes providing a compressor for compressing gas and a flowpath for the compressed gas. The method also includes coating a portion of the flowpath with a heat resistant powder paint and reducing the surface roughness of the portion of the flowpath.

These and other aspects of the present invention will be apparent from the following description of the preferred embodiment, the drawings and the claims.

DESCRIPTION OF THE PREFERRED EMBODIMENT

Figure 1:
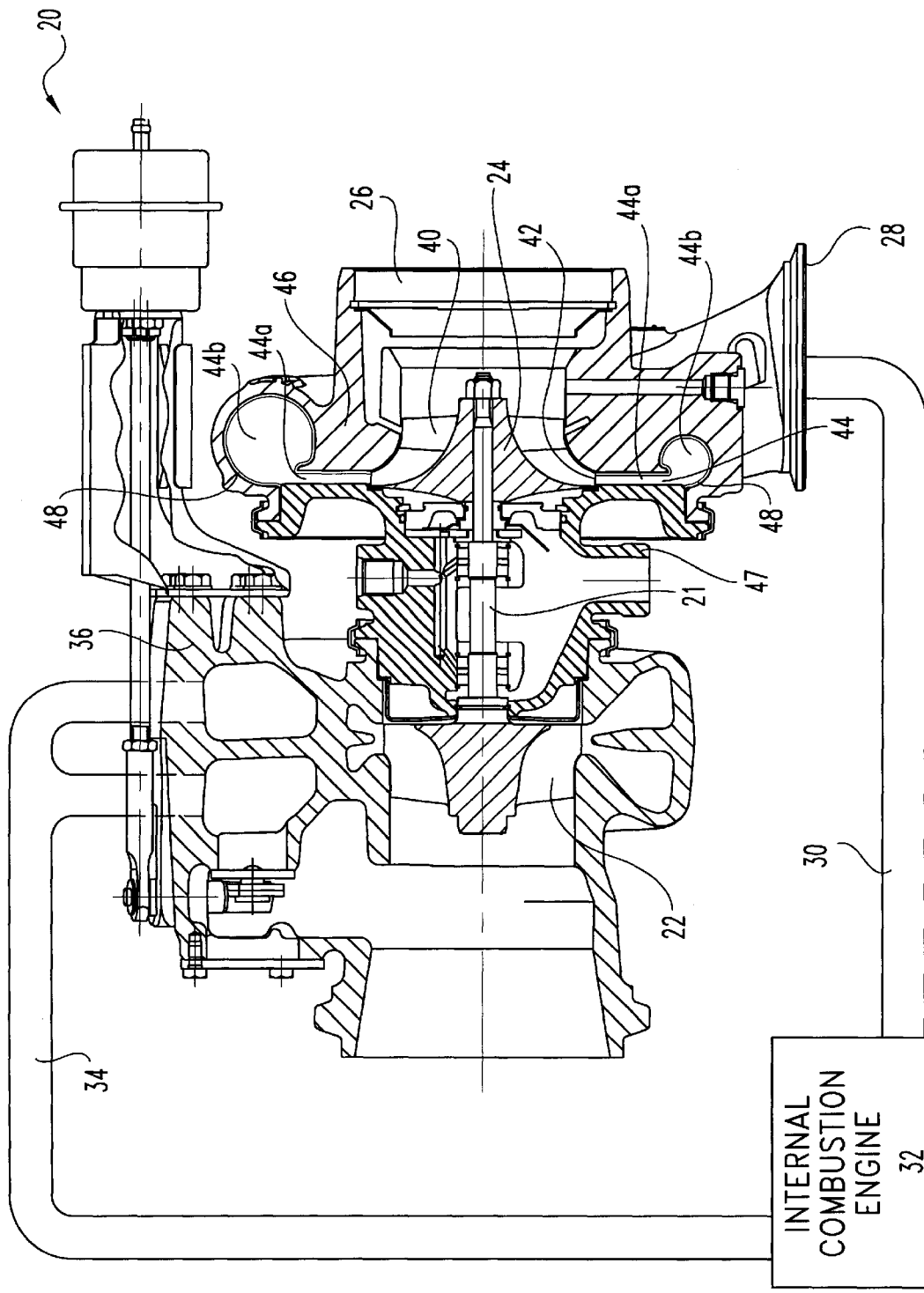
FIG. 1 is a schematic representation of an internal combustion engine, and a partial cross-sectional drawing of a turbocharger according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated devices, and further applications of the principles of the invention as illustrated therein are herein contemplated as would normally occur to one skilled in the art to which the invention relates.

The present invention provides methods and apparatus for improving the efficiency of centrifugal compressors. Centrifugal compressors typically include a plurality of curved and swept blades that suck in a gas such as air from an inlet at relatively low velocity, and because of the high rotational speed of the blades, imparts a high velocity to the air. This high velocity air exits from the tips of the blades into a diffuser or volute. The diffuser includes a flowpath with a cross-sectional area that generally increases in the direction of the flow of the high velocity air. The increasing cross-sectional area of the flowpath causes the velocity of the air to reduce with a resultant increase in the static pressure of the air.

The efficiency with which the centrifugal compressor can convert work into compressed air depends upon a variety of factors. One of the factors is the amount of energy lost by the high velocity gas due to aerodynamic drag along the walls of the diffuser defining the flowpath. Any energy lost to drag is unrecoverable, and appears as a decrease in the efficiency of the compressor.

The present invention includes the discovery of a reliable, low cost coating that can be applied to the internal flowpath of a diffuser which significantly reduces the surface roughness of a portion of the flowpath. The decreased surface roughness of the coated portion of the flowpath results in less aerodynamic drag and an increase in the efficiency of the centrifugal compressor.

In a preferred embodiment of the present invention, a coating of heat-resistant epoxy or epoxy/hybrid powder paint coats a portion of the flowpath in the diffuser and reduces the surface roughness of that portion. The coating can reduce the roughness average (Ra) of the as-cast surface of a sand cast diffuser from about 250 to 300 microinches to about 25 to 30 microinches, or a reduction of about 8 to 1 to about 12 to 1. In one specific application of a turbocharger volute, coating of a portion of the flowpath according to the present invention resulted in an increase in compressor efficiency from about 0.75% to 1%.

The term "as-cast surface" used herein refers to a surface of a component that was produced by a casting technique. After casting, there is no additional removal of material from the as-cast surface, such as by grinding, honing, or filing. However, after casting the component may be heat treated or exposed to chemical treatments, such as for corrosion protection.

FIG. 1 shows a turbocharger incorporating one embodiment of the present invention in partial cross section. A turbocharger 20 includes a rotor 21 with a turbine 22 and a centrifugal compressor 24. Compressor 24 accepts air from an inlet 26 and provides compressed air through an outlet 28. This compressed air is provided to an intake manifold 30 of an internal combustion engine 32, such as a diesel engine or a spark ignition engine. An exhaust manifold 34 of engine 32 directs the exhaust gas of the engine to a turbine housing 36 from which the exhaust gases drive turbine 22.

Centrifugal compressor 24 includes a plurality of swept and curved blades 40. Rotation of compressor 24 results in blades 40 inducing air from inlet 26. This air is centrifugally slung from the tips 42 of blades 40 at a high velocity into a flowpath 44. Flowpath 44 is at least partially defined by a cast diffuser, or volute, 46. A portion 44a of flowpath 44 is defined between facing, opposing walls of diffuser 46 and bearing housing 47. Another portion 44b of flowpath 44 is defined by a generally circularly cross-sectioned area of diffuser or volute 46 that increases in area as the compressed air flows toward outlet 28.

Figure 3:
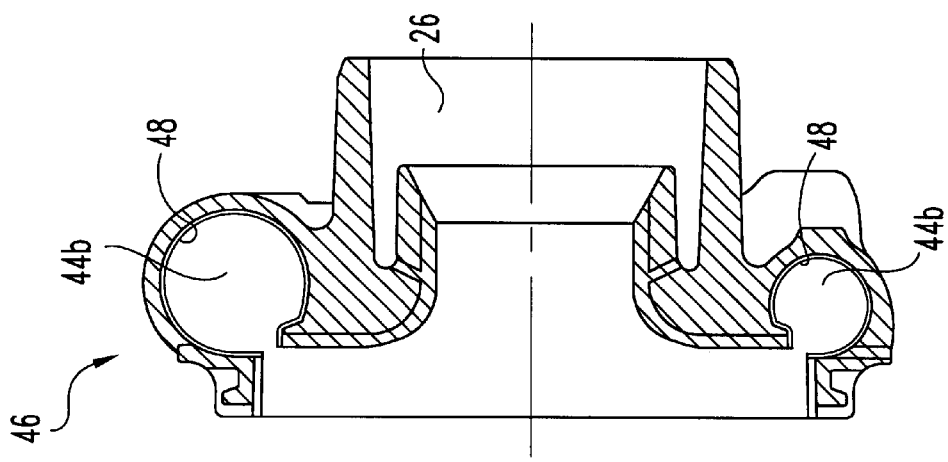
FIG. 3 is a cross-sectional view of the volute of FIG. 2 as taken along line 3—3 of FIG. 2.
Figure 2:
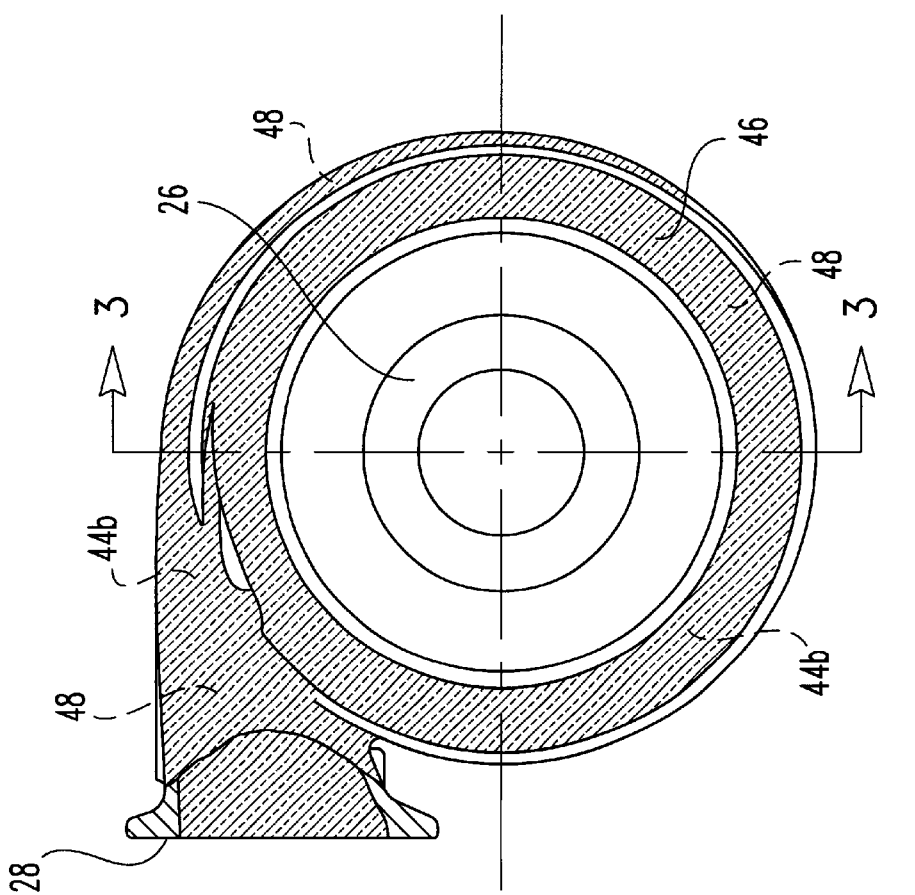
FIG. 2 is an end view of the volute of the turbocharger of FIG. 1.
Figure 4:
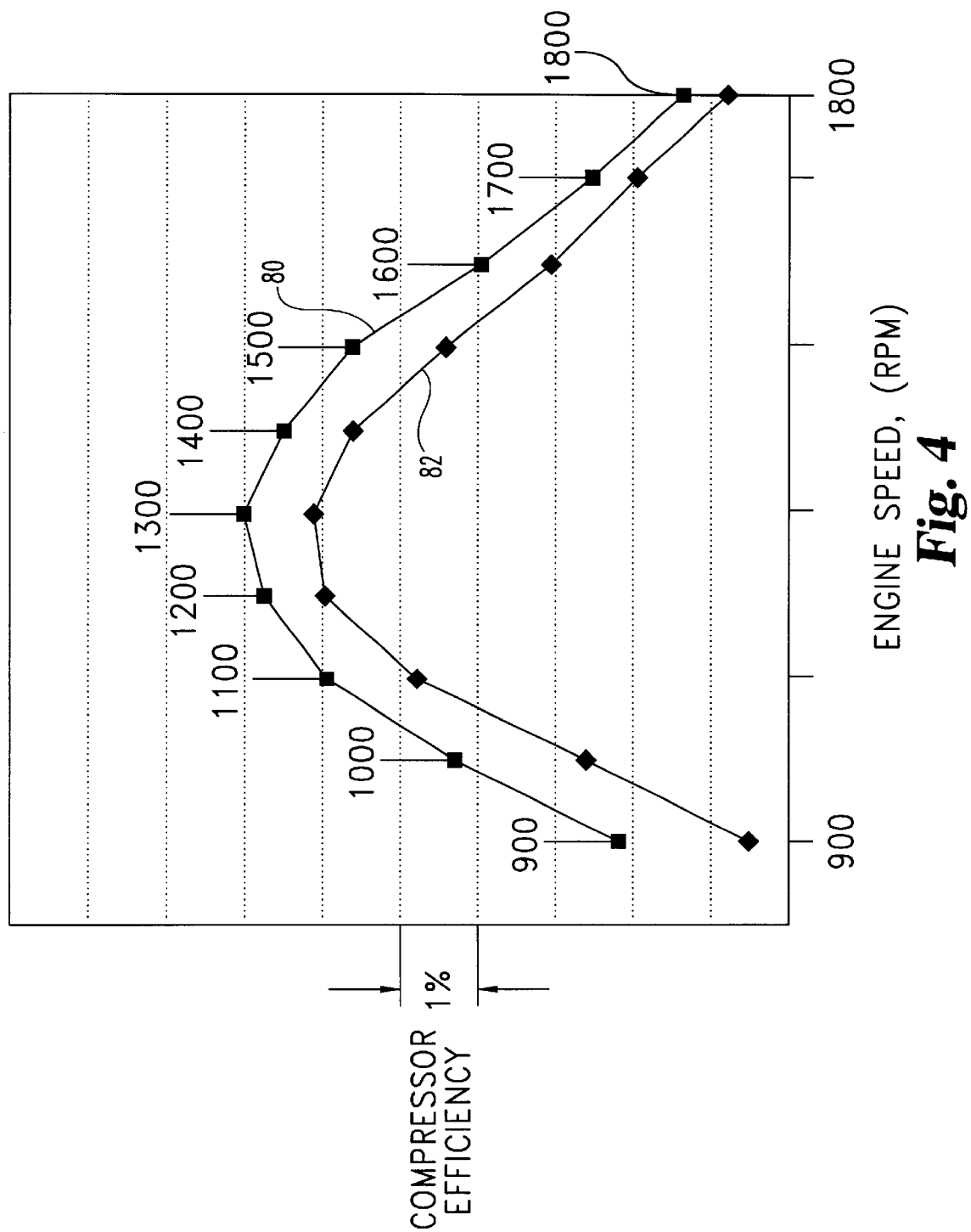
FIG. 4 is a graph of compressor efficiency versus engine speed.

FIGS. 2 and 3 depict a turbocharger volute 46 coated according to one embodiment of the present invention. In this embodiment, a coating 48 of epoxy or epoxy/hybrid powder paint is applied along portion 44b of internal flowpath 44. FIG. 2 shows an external view of volute 46 with coating 48, which is applied internally along portion 44b, depicted in crosshatch. A turbocharger incorporating this embodiment was installed on a Cummins diesel engine which was run at full throttle under varying conditions of engine speed. An efficiency map for the turbocharger incorporating this embodiment of the present invention is represented by efficiency curve 80 of FIG. 4. The engine was also run under the same load and speed conditions with a turbocharger not incorporating the present invention. Compressor efficiency from this baseline test is plotted as efficiency curve 82 on FIG. 4. Compressor efficiency was improved from about .050% to about 1.50% over the speed range, and about .075% to about 1% near the engine's lowest brake specific fuel consumption (BSFC). The improvement in turbocharger compressor efficiency provided in this specific embodiment of the present invention resulted in a decrease in engine BSFC from about .025% to about .033%.

Figure 5:
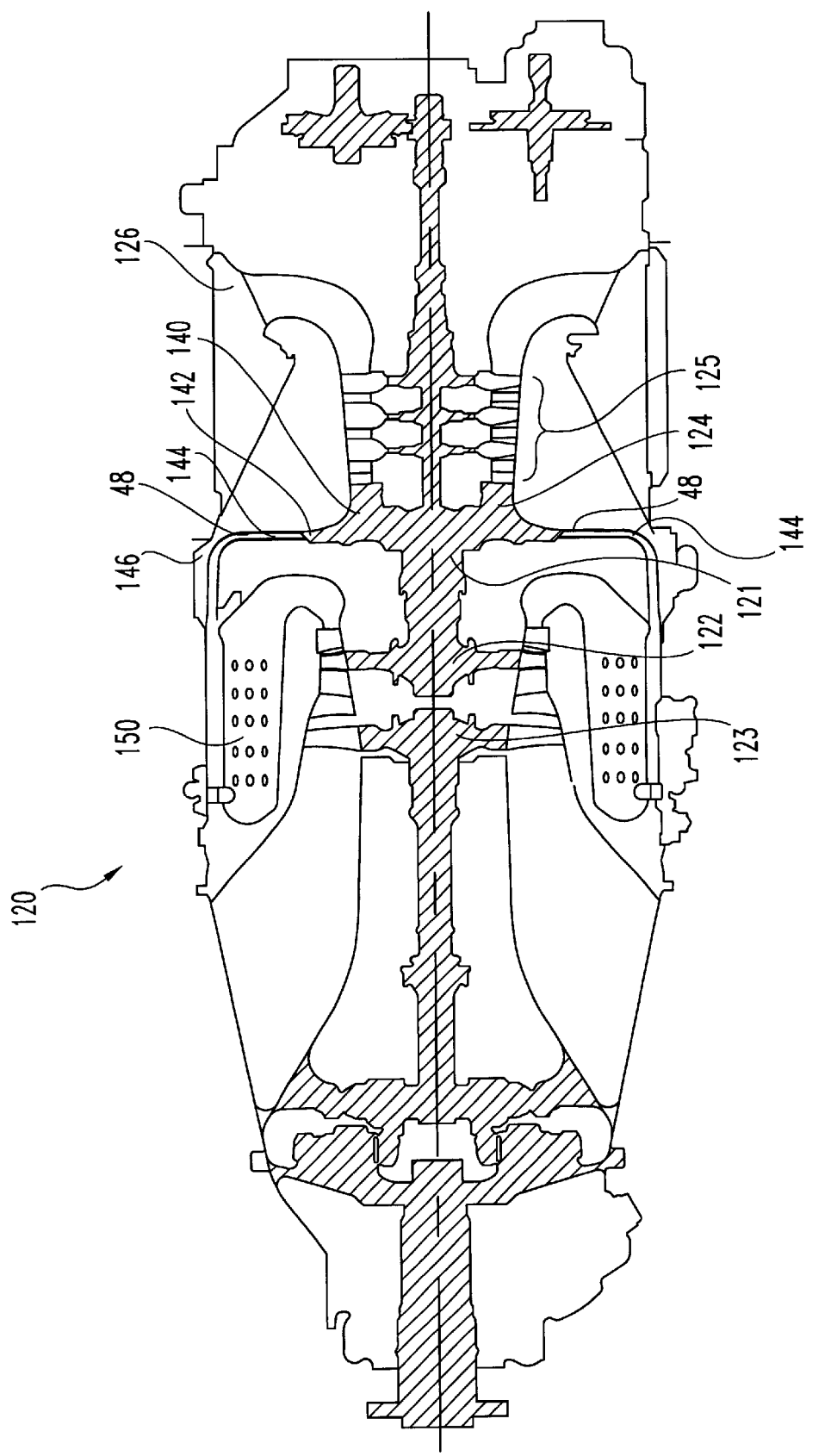
FIG. 5 is a cross-sectional schematic representation of a gas turbine engine incorporating another embodiment of the present invention.

A gas turbine engine 120 incorporating another embodiment of the present invention is depicted in a schematic cutaway drawing in FIG. 5. Gas turbine engine 120 includes a gasifier rotor 121. Rotor 121 includes a gasifier turbine 122 that drives a compressor. The compressor includes an axial compressor 125 that receives air from an inlet 126 and provides compressed air to a centrifugal compressor 124. Compressed air from centrifugal compressor 124 exits at high velocity past blade tips 142 into flowpath 144 which is at least partially defined by diffuser 146. The compressed air expands within diffuser 146 prior to entering combustor 150 where fuel is added (not shown) and burned. The hot gas leaving combustor 150 drives both gasifier turbine 122 and also power turbine 123. The engine schematically depicted in FIG. 5 is similar to a Pratt & Whitney PT6-series gas turbine engine.

Centrifugal compressor 124 of gas turbine engine 120 operates in a manner like that of centrifugal compressor 24 of turbocharger 120. Rotation of centrifugal compressor 124 causes curved and swept blades 140 to centrifugally sling air at high velocity into flowpath 144. A wall of diffuser 146 defines internal flowpath 146, along with a generally opposing wall of another stationary component of the engine. Flowpath 144 has a cross-sectional area that increases in the direction of flow. Because of this increasing cross-sectional area, the high velocity of the gas exiting past blade tips 142 expands and decelerates, with increasing static pressure. In this embodiment of the present invention coating 148 is applied along the portion of the walls of flowpath 144 that are scrubbed with high velocity gas. For those applications where diffuser 146 has a rough internal surface, such as a diffuser 146 fabricated by sand casting, coating 148 significantly decreases the surface roughness and thereby decreases the aerodynamic drag of diffuser 146 on the high velocity gas. The present invention also contemplates those embodiments in which a coating is applied to other components that come into contact with the high velocity gas exiting the centrifugal compressor, including components such as bearing supports, scrolls, and combustor outer cases.

In a most preferred embodiment, coating 148 is an epoxy or epoxy/hybrid powder paint. In a preferred method of application, a sand cast diffuser is cleaned, dried, and heated to a temperature in excess of 300° F., and preferably to about 350° F. Since the coating of the present invention produces a reliable, tenacious, heat resistant coating, there is no need for preparation of the sand cast diffuser to mechanically smooth the internal surfaces along the flowpath, except to remove excess casting flash or other stock. The powder paint is then sprayed onto the heated diffuser in a conventional manner. With sand cast diffusers that are turbocharger volutes or gas turbine scrolls, it is preferable to spray the powder paint in the direction of flow. The powder paint melts upon contacting the surface of the hot diffuser and flows into and smoothes over the small irregularities in the surface of the diffuser. The diffuser is then heated to a temperature in excess of 400° F., and preferably about 425° F. for about seven minutes, for cross-linking of the thermosetting resin.

A coating 148 has been described on portions of internal flowpaths for diffusers used in both turbochargers and gas turbine engines. Those of ordinary skill in the art will recognize the application of a coating according to the present invention on diffusers used with centrifugal compressors in other applications, where compressor efficiency is important and where the diffuser is fabricated from a method that leaves a relatively rough surface for the flowpath, such as sand casting. For example, the present invention also contemplates centrifugal compressors used in pipelines for gas pumping. The present invention is not limited to sand cast diffusers, however, and is applicable to any process that leaves a relatively rough surface. In addition, the present invention also contemplates repair applications, in which the coating is applied to a roughened portion of the flowpath of a component scrubbed with high velocity gas from a centrifugal compressor, the portion having been roughened by pitting, erosion, or other roughening processes during operation of the compressor.

A coating according to the present invention is heat-resistant and tenacious. In compressor applications including turbochargers and gas turbine engines, heat resistance is important because of the high maximum operating temperature of the diffuser. For example, the volute of a Holset turbocharger used on a Cummins diesel engine can have a maximum operating temperature of about 450° F. Coatings of epoxy powder paint according to the present invention have demonstrated almost no degradation after being exposed to 600° F. After exposure to 800° F., some small, hairline cracks appeared in the paint, but even so, the paint was tenacious and was still very firmly attached to the metal. After exposure to 1,000° F., the paint appeared to be ablating or evaporating, leaving a very thin flake that would be removed by the high velocity gas passing over the coating.

In a most preferred embodiment of the present invention, the coating is produced from a powder paint such as one of the following or their equivalents: PC M 90119 Black Epoxy, produced by PPG Industries; 10-759 Black Epoxy, produced by Morton Thikol; P9659 KPN Black Polyester/Epoxy Hybrid, produced by Hentzen Coating; or VE1383 Black Epoxy or LZ7239C Low Gloss Black Epoxy, produced by Ferro Coating. The present invention also contemplates the use of other heat resistant powder paint coatings including other materials, such as acrylic compounds, alkyd compounds and silicone compounds that fill and smooth over surface irregularities and that are resistant to temperatures in excess of 400 ° F. Most preferably, the coating has the physical properties described in Table 1, as determined by the appropriate ASTM or other test procedure and test requirement. However, those of ordinary skill in the art will recognize appropriate changes that can be made to the properties, procedures, and requirements of Table 1 for particular applications.

TABLE 1

| Physical Properties/Test Procedures | Requirements |
| --- | --- |
| Film thickness (ASTM D1186) | 2.0 mils plus/minus 0.5 |
| Gloss Level (ASTM D 523) | 55 plus/minus 5.0 degree at 60 degre angle |
| Flexibility Test (Federal Std. 141) | Pass ¼ inch Mandrel Test |
| Impact Resistance (ASTM 2794) | 60 inch lbs direct, 60 inch lbs indirect at 20 gate. |
| Hardness Test (ASTM 3363) | 95–100 percent |
| Crosshatch Adhesion Test (ASTM 3359) | 500 hours |
| Salt Spray (Fog) Test (ASTM B117) | 500 hours |
| Humidity Test (ASTM 2247) | 500 hours min. |
| Water Soak Test (ASTM D 870) | 72 hrs minimum at 100 deg Fahrenheit |
| Decoatability (ASTM 1640) | Compatible with water-borne alkyd, high solids alkyd & urethanes; no lifting, blistering or intercoat |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
   an internal combustion engine accepting compressed intake air and producing exhaust gas;
   a turbocharger including a turbine and a centrifugal compressor with blades, said turbine being powered by the exhaust gas, said turbine powering said centrifugal compressor, said centrifugal compressor providing compressed intake air to said engine, said turbocharger including a wall defining a flowpath for slowing the air exiting from said blades of said centrifugal compressor, said wall having an as-cast surface from being sand cast; and
   a coating of heat resistant powder paint on a portion of said wall, said coating providing a smooth surface to reduce the aerodynamic drag of the air flowing over said wall.

2. The apparatus of claim 1 wherein said powder paint includes an epoxy compound.

3. The apparatus of claim 1 wherein said powder paint includes an acrylic compound.

4. The apparatus of claim 1 wherein said powder paint includes an alkyd compound.

5. The apparatus of claim 1 wherein said powder paint includes a silicone compound.

6. The apparatus of claim 1 wherein the as-cast surface of the wall has a first surface roughness, said coating of heat-resistant paint has a second surface roughness, and the first surface roughness is more than about eight times the roughness of the second surface roughness.

7. An apparatus comprising:
   a centrifugal compressor for compressing gas;
   a cast diffuser defining an internal flowpath receiving compressed gas from said centrifugal compressor, said cast diffuser having a substantially as-cast internal surface along a portion of the flowpath; and
   a coating of heat-resistant paint in said cast diffuser along the portion of the internal flowpath.

8. The apparatus of claim 7 wherein said cast diffuser is sand cast.

9. The apparatus of claim 7 wherein said paint is a powder paint including an epoxy compound.

10. The apparatus of claim 7 wherein said paint is a powder paint including an acrylic compound.

11. The apparatus of claim 7 wherein said paint is a powder paint including an alkyd compound.

12. The apparatus of claim 7 wherein said paint is a powder paint including a silicone compound.

13. The apparatus of claim 7 wherein said cast diffuser is a cast volute, and which further comprises a turbine for driving said centrifugal compressor and an internal combustion engine for receiving the compressed gas, said internal combustion engine providing exhaust gas to drive said turbine.

14. The apparatus of claim 13 wherein said cast volute has a maximum operating temperature of more than about 400 degrees F.

15. The apparatus of claim 7 which further comprises a gas turbine engine with a combustor, said compressor compressing gas within said gas turbine engine, said diffuser expanding the compressed gas within said gas turbine engine prior to said compressed gas entering said combustor.

16. The apparatus of claim 15 wherein said cast diffuser has a maximum operating temperature of more than about 400 degrees F.

17. The apparatus of claim 7 wherein the portion of the substantially as-cast internal surface has a first surface roughness, said coating of heat-resistant paint has a second surface roughness, and the first surface roughness is more than about eight times the roughness of the second surface roughness.

18. A method for improving the efficiency of a centrifugal compressor, including:
   providing a centrifugal compressor for compressing gas and a cast diffuser with a flowpath for the compressed gas, the diffuser having an as-cast surface along a portion of the flowpath;
   coating a portion of the flowpath with a heat-resistant powder paint and reducing the surface roughness of the portion of the flowpath.

19. The method of claim 18 wherein said cast diffuser is sand cast.

20. The method of claim 18 wherein said powder paint includes an epoxy compound.

21. The method of claim 18 wherein said powder paint includes an acrylic compound.

22. The method of claim 18 wherein said powder paint includes an alkyd compound.

23. The method of claim 18 wherein said powder paint includes a silicone compound.

24. The method of claim 18 which further comprises flowing the compressed gas from the centrifugal compressor over the coated portion of the flowpath and into a combustor of a gas turbine engine.

* * * * *